Figure 1:
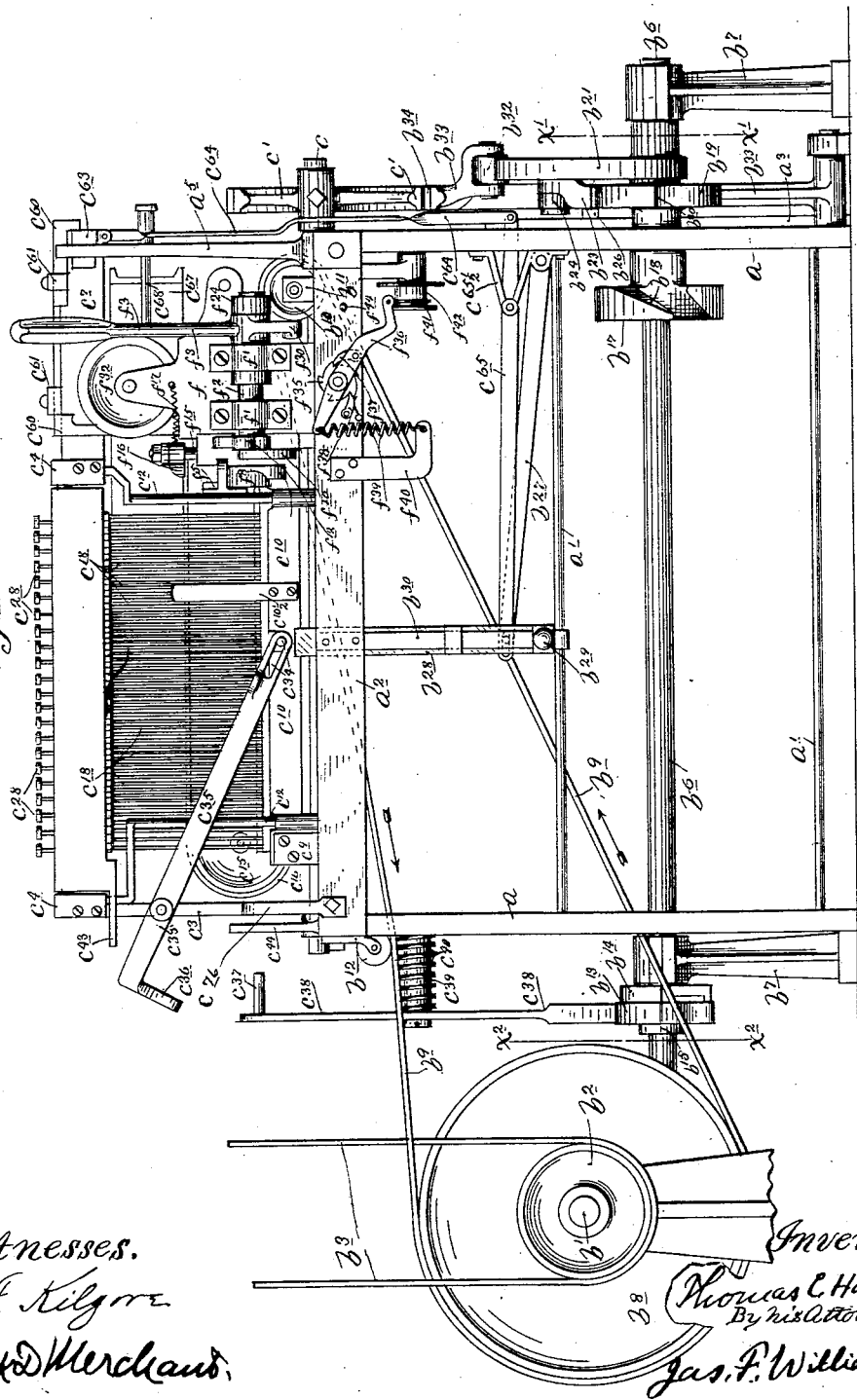

(No Model.) 11 Sheets—Sheet 1.
T. C. HARGRAVE.
MATRIX MAKING MACHINE.

No. 541,161. Patented June 18, 1895.

Witnesses.
C. F. Kilgore
Frank D. Merchant

Inventor.
Thomas C. Hargrave
By his Attorney.
Jas. F. Williamson (No Model.) 11 Sheets—Sheet 4.

T. C. HARGRAVE.
MATRIX MAKING MACHINE.

No. 541,161. Patented June 18, 1895.

Witnesses.
C. F. Kilgore
Frank T. Merchant

Inventor,
Thomas C. Hargrave
By his Attorney.
Jas. F. Williamson (No Model.)  11 Sheets—Sheet 5.

T. C. HARGRAVE.
MATRIX MAKING MACHINE.

No. 541,161. Patented June 18, 1895.

Witnesses.
C. F. Kilgore
Frank D. Merchant

Inventor.
Thomas C. Hargrave
By his Attorney.
Jas. F. Williamson

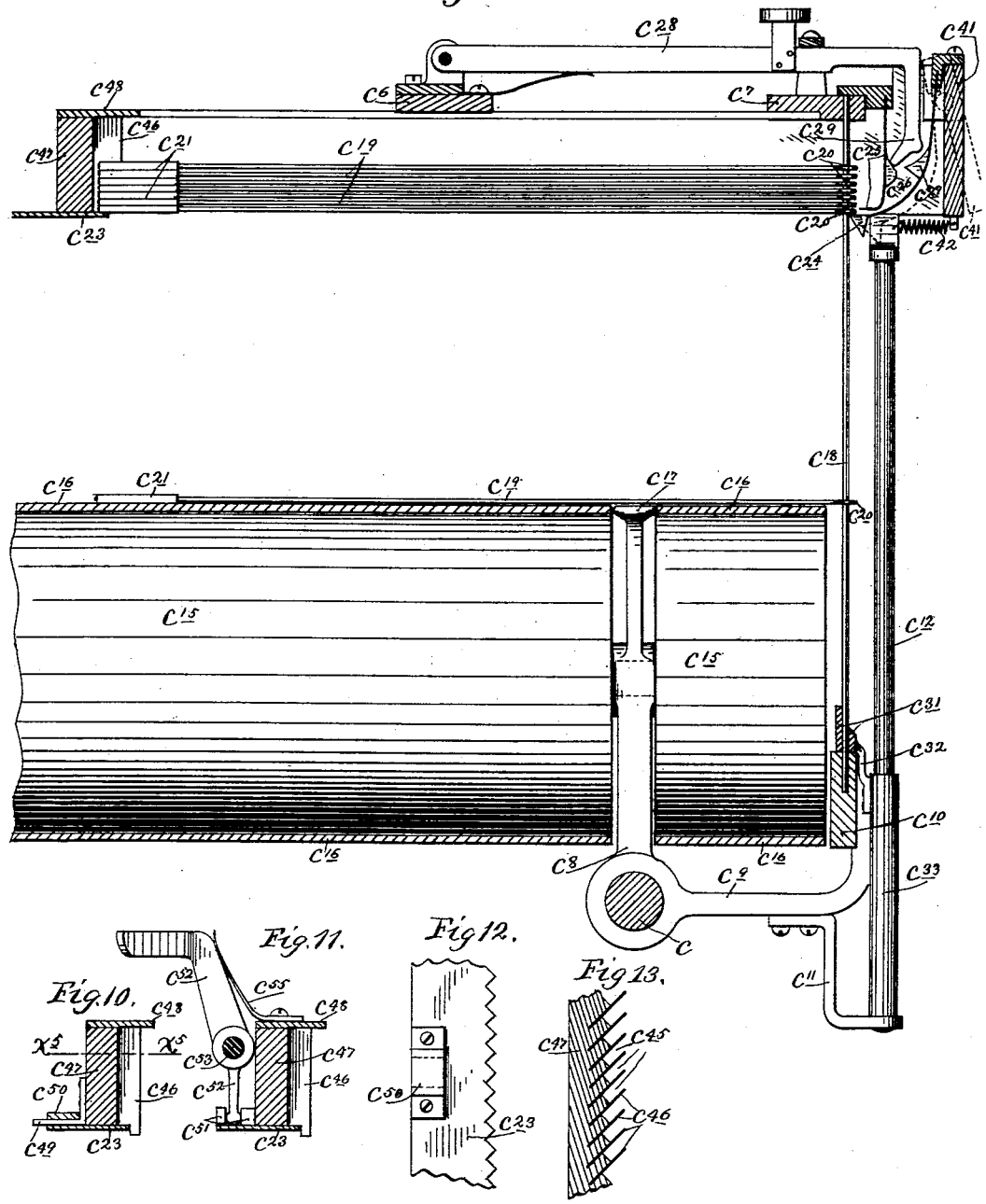

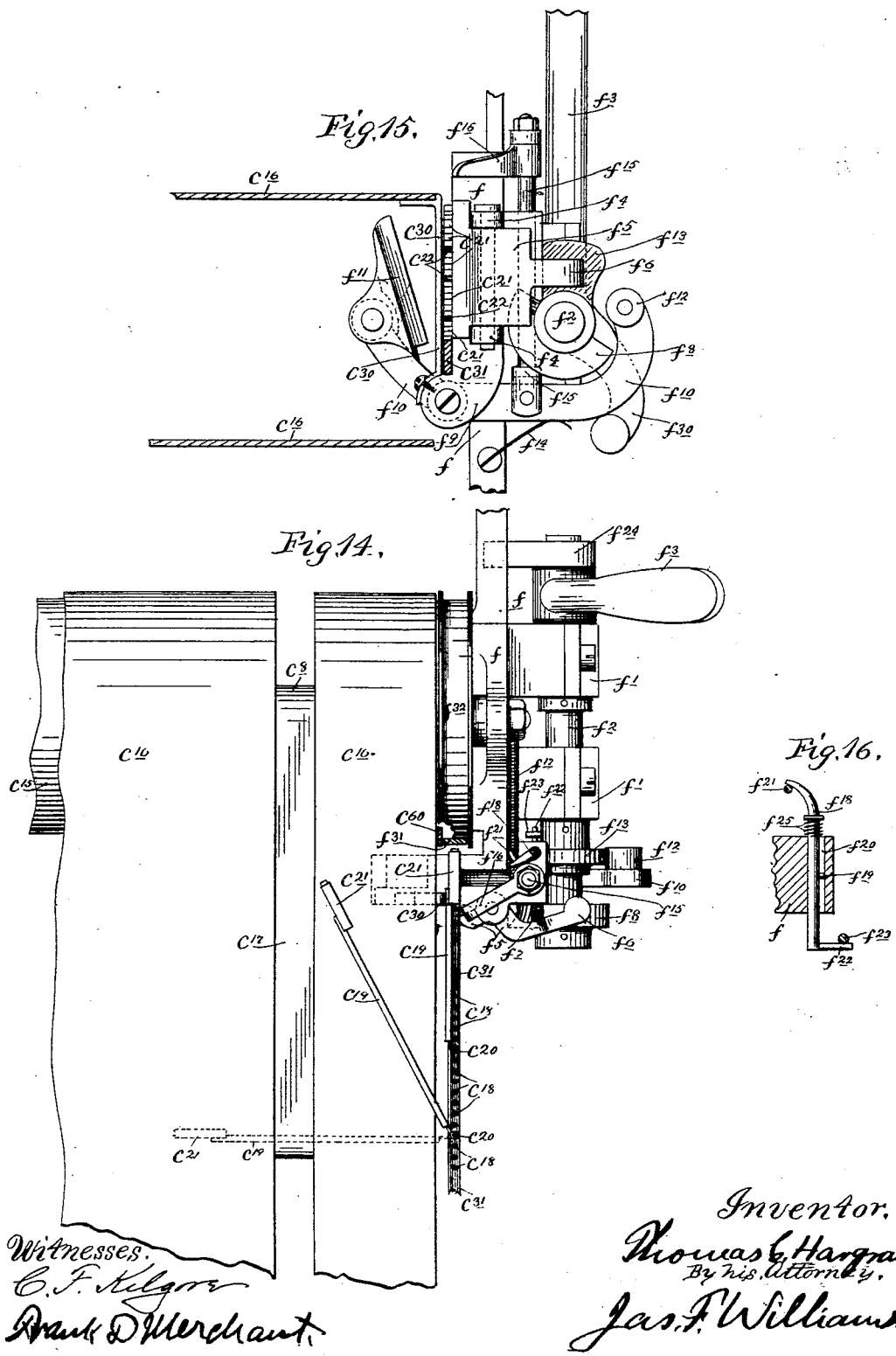

(No Model.)  11 Sheets—Sheet 8.
T. C. HARGRAVE.
MATRIX MAKING MACHINE.
No. 541,161. Patented June 18, 1895.
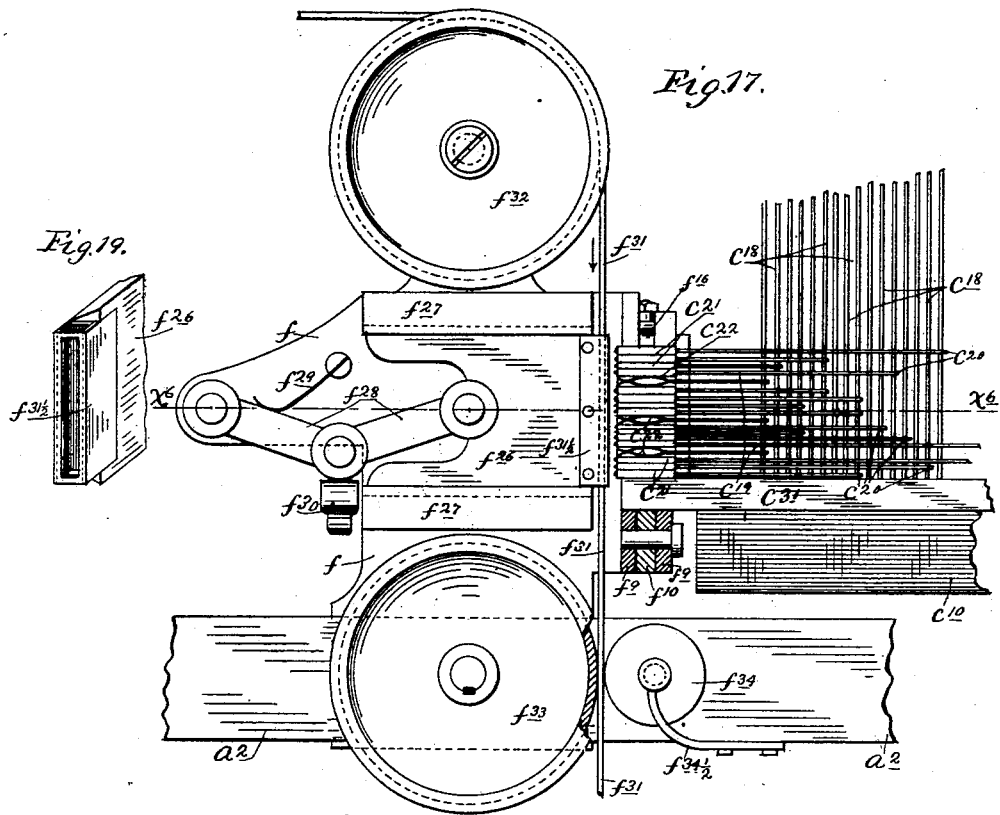
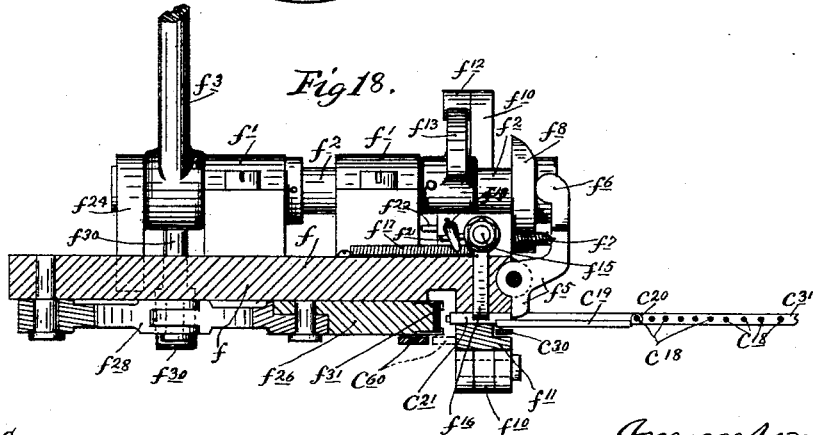
Witnesses.
C. F. Kilgore
Frank D. Merchant
Inventor.
Thomas C. Hargrave,
By his Attorney,
Jas. F. Williamson (No Model.)  11 Sheets—Sheet 9.

T. C. HARGRAVE.
MATRIX MAKING MACHINE.

No. 541,161.  Patented June 18, 1895.

Witnesses,
C. F. Kilgore
Frank D. Merchant

Inventor.
Thomas C. Hargrave
By his Attorney,
Jas. F. Williamson

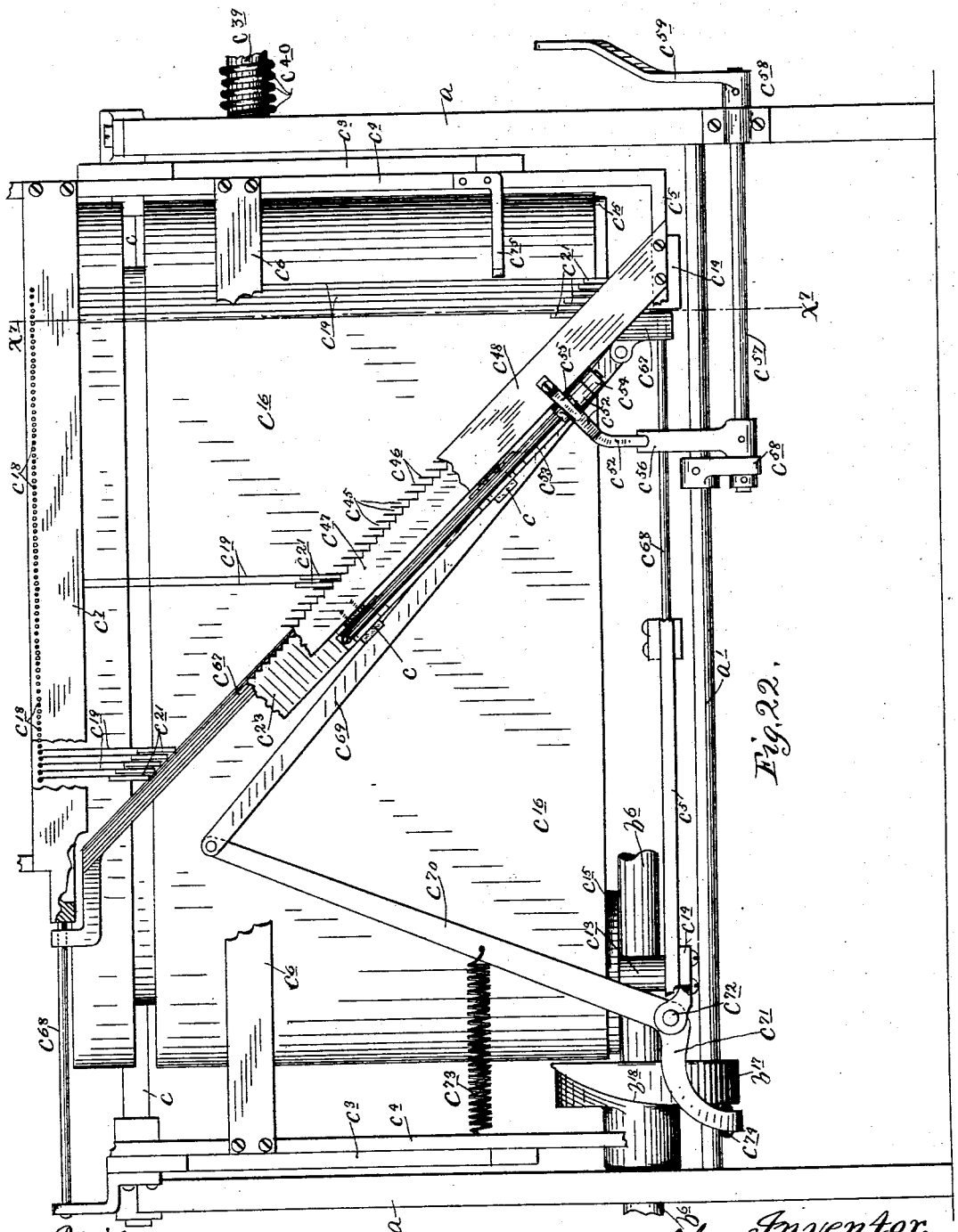

UNITED STATES PATENT OFFICE.

THOMAS C. HARGRAVE, OF MINNEAPOLIS, MINNESOTA, ASSIGNOR TO THE HARGRAVE MATRIX MACHINE COMPANY, OF SAME PLACE.

MATRIX-MAKING MACHINE.

SPECIFICATION forming part of Letters Patent No. 541,161, dated June 18, 1895.

Application filed December 4, 1894. Serial No. 530,821. (No model.)

*To all whom it may concern:*

Be it known that I, THOMAS C. HARGRAVE, a citizen of the United States, residing at Minneapolis, in the county of Hennepin and State of Minnesota, have invented certain new and useful Improvements in a Machine for the Production of Print or Printing Surfaces; and I do hereby declare the following to be a full, clear, and exact description of the invention, such as will enable others skilled in the art to which it appertains to make and use the same.

My invention has for its object to provide an improved machine for the production of print or printing surfaces. The mechanism is adapted to assemble dies and compressible spaces into a common line of assembly, compress the same into a justified line, take an impression therefrom, and distribute or return the released and assembled dies into their normal or initial positions. In so far as the assembling and distributing mechanisms are concerned, the dies employed may be either male or female; and the impression mechanism employed is adapted to hold and operate any suitable strip of impression material. Hence, with the machine as organized and herein disclosed, with the use of the male dies, there may be produced, either a printed impression, or a matrix, from which printing surfaces may be subsequently cast. My machine, however, was especially designed for the production of justified matrices in a suitable matrix material, from which linotypes or stereotype plates may be subsequently cast; and in the accompanying drawings, I have shown the same as organized for this purpose.

From the foregoing, it will also be understood, that my machine is of that variety of matrix machines, wherein the whole line of dies are first assembled, and then impressed, with a single action, into the matrix material. This, of course, gives an opportunity for justification, by the use of compressible spacers; and eliminates many of the difficulties, which are always experienced in attempting to secure good matrices from the action of individual dies impressed in succession.

The novel features of my machine will appear from the detailed description hereinafter given, and will be defined in the claims.

The accompanying drawings illustrate my invention, wherein like notations refer to like parts throughout the several views.

Figure 2:
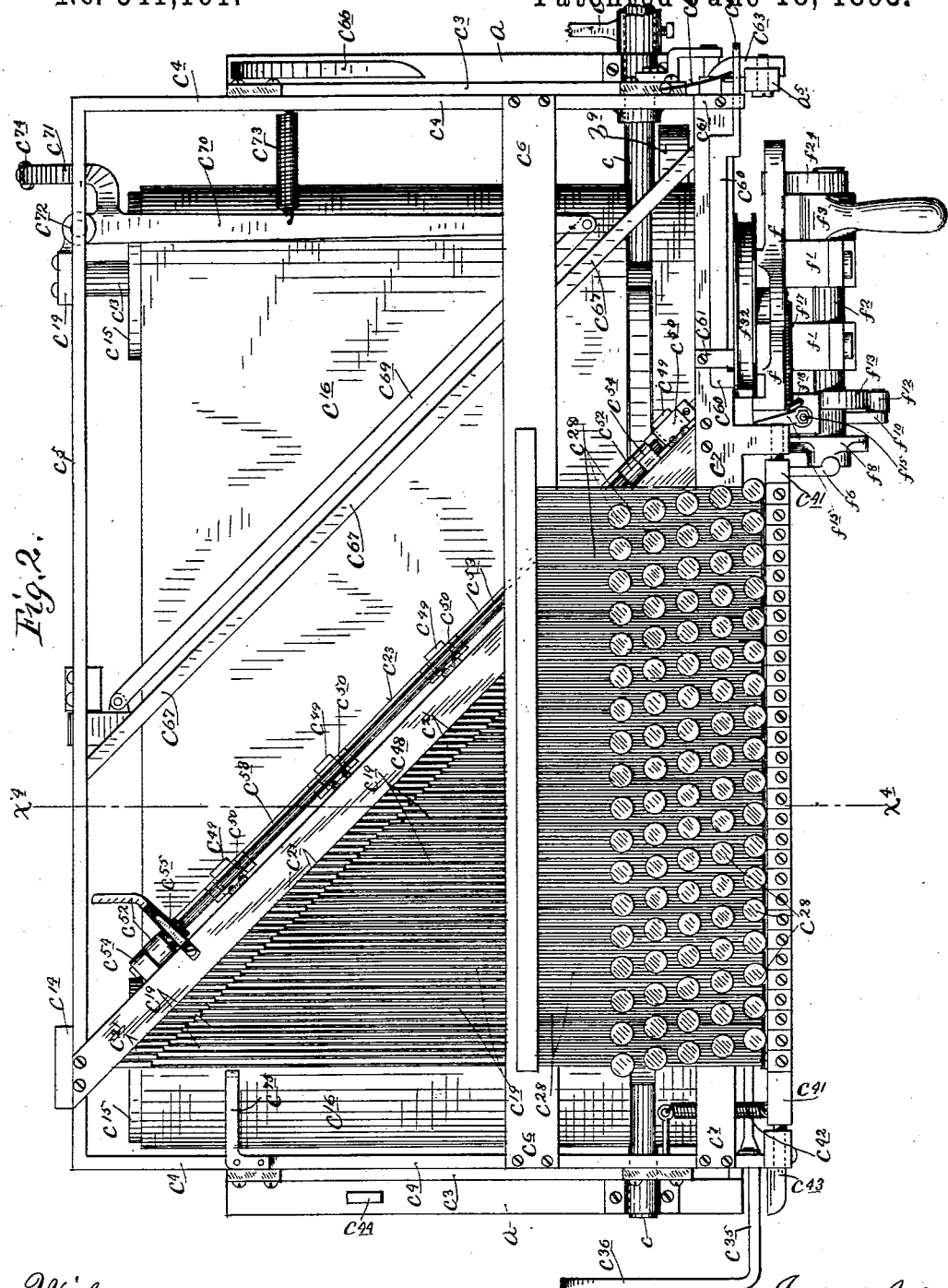
Figure 3:
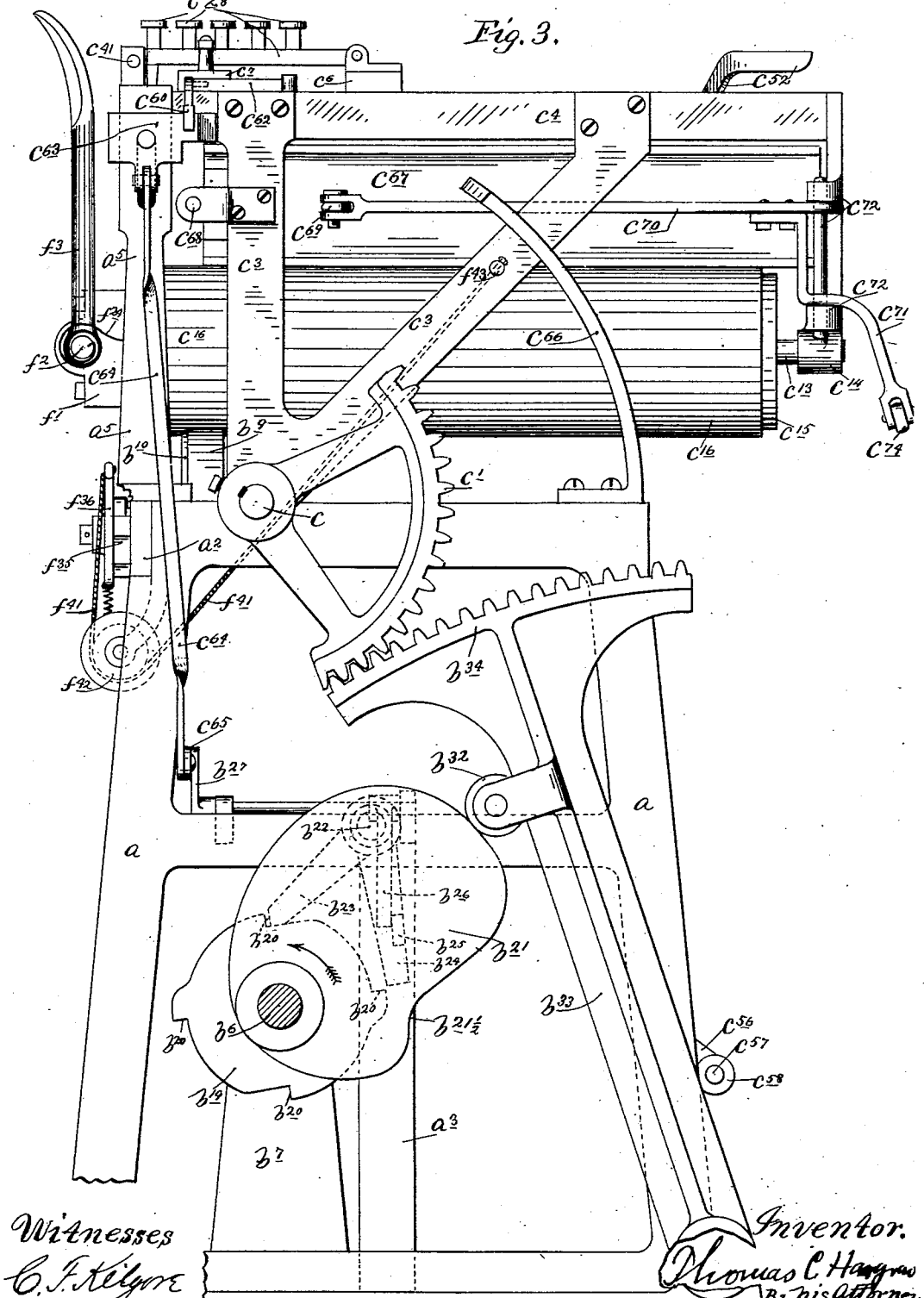
Figure 4:
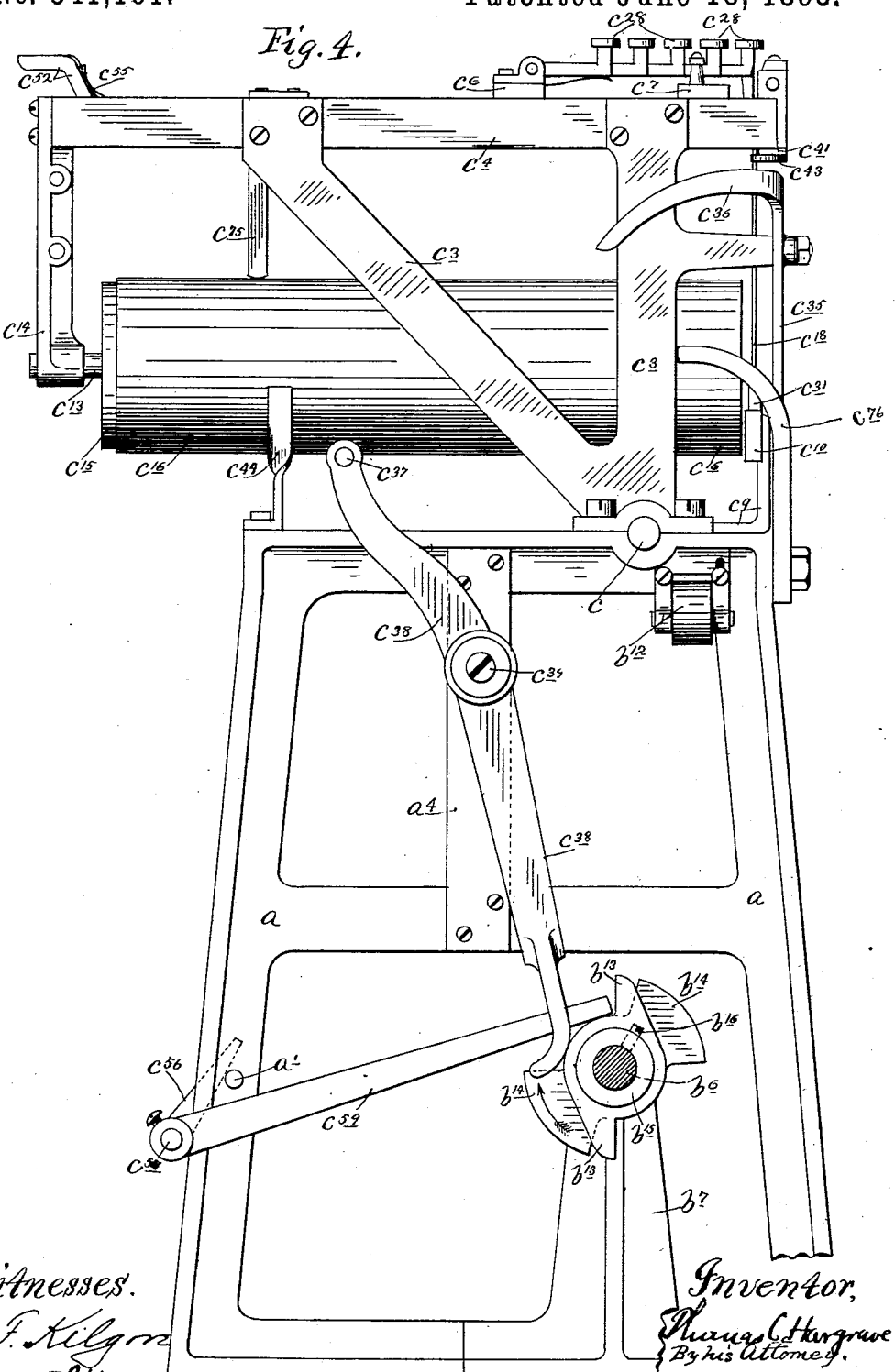
Figure 6:
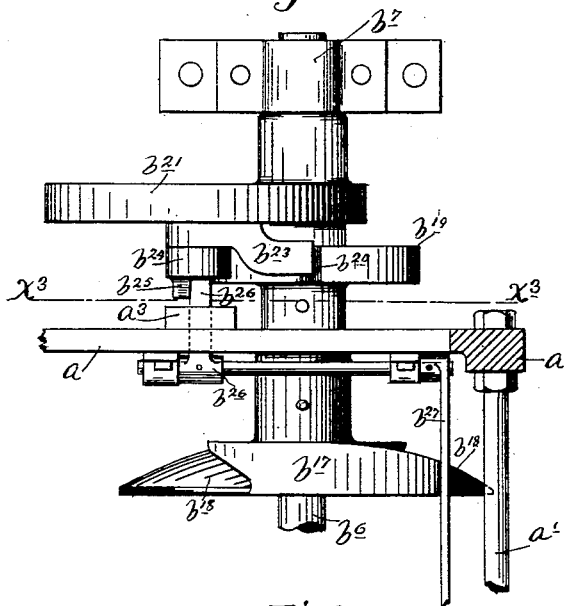
Figure 7:
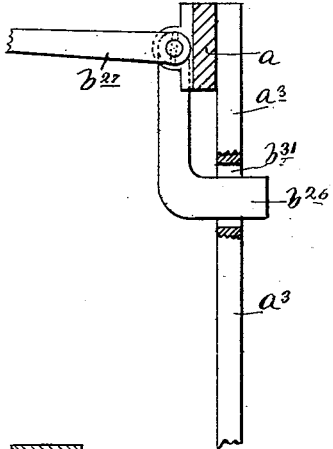
Figure 8:
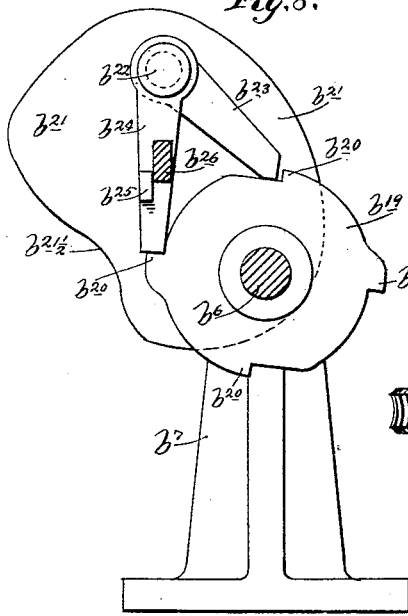
Figure 5:
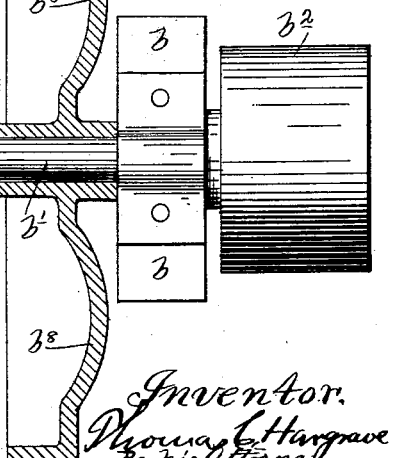
Figure 20:
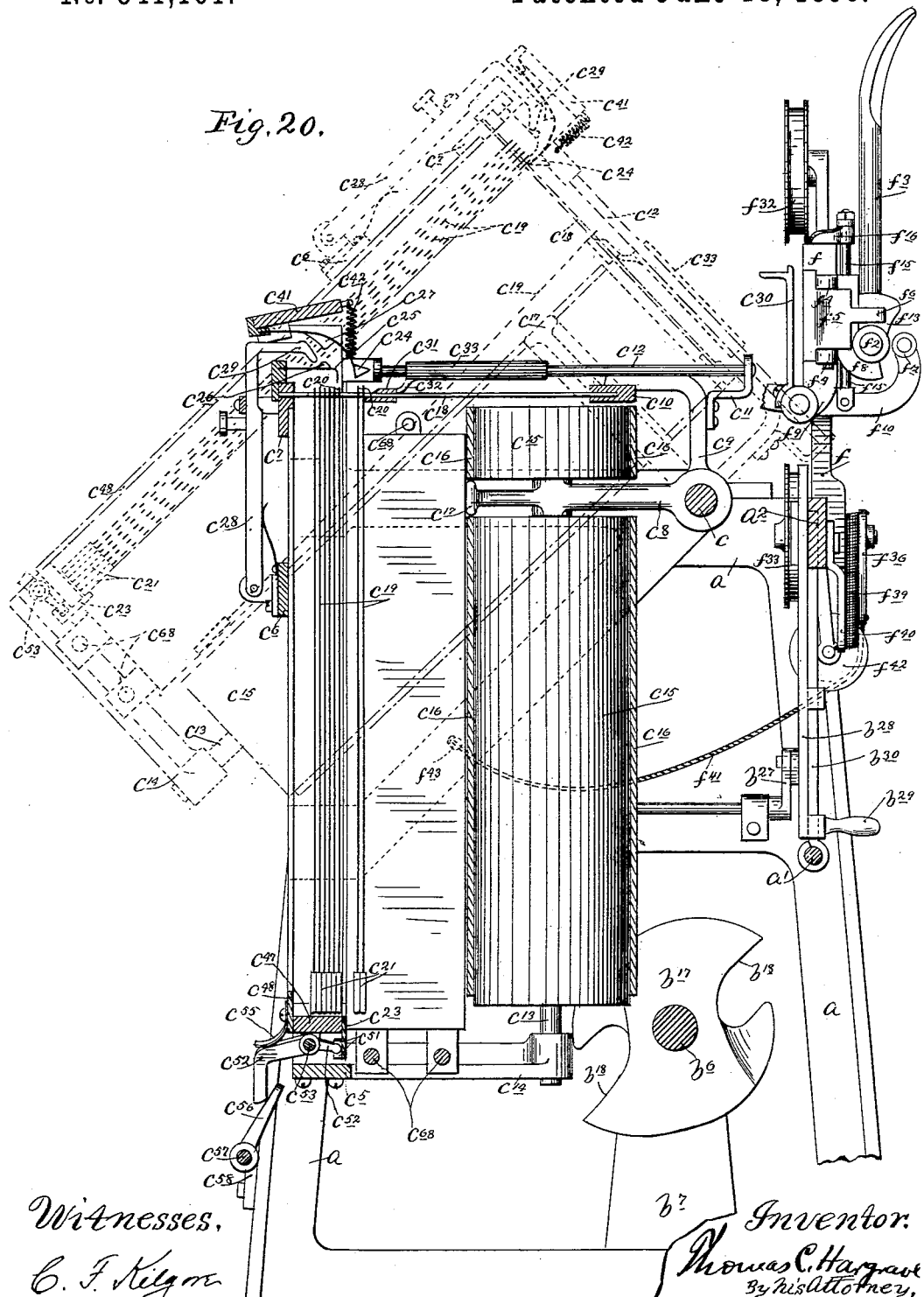
Figure 21:
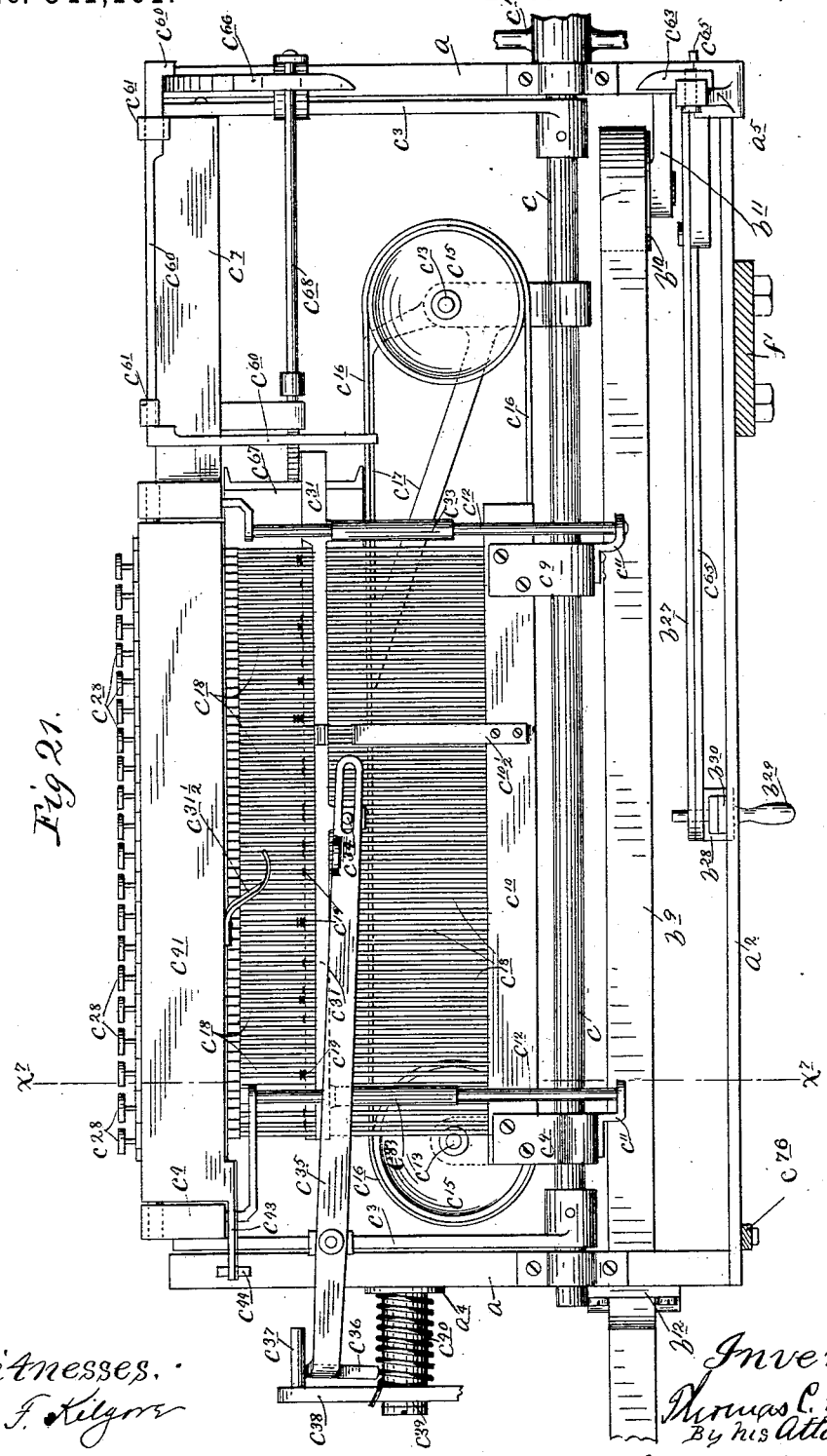

Figure 1 is a front elevation of the machine with some parts broken away. Directions will be taken with respect to the position of an observer facing this view. Fig. 2 is a plan view of the top part of the machine, some of the underneath parts being omitted. Fig. 3 is a view of the machine chiefly in right end elevation, but partly in section on the line $X'$ $X'$ of Fig. 1, and with some parts broken away. Fig. 4 is a view of the machine chiefly in left end elevation, but partly in section on the line $X^2$ $X^2$ of Fig. 1, some parts being removed. Fig. 5 is a detail chiefly in plan, but partly in horizontal section, showing the relation of the transverse driving-shaft to the longitudinal cam-bearing counter-shaft driven thereby. Fig. 6 is a detail in plan, showing the relation of the cam-bearing counter-shaft to the table-controlling cam thereon and the trip for the driving connection between the shaft and the cam. Fig. 7 is a detail of the trip-lever shown in Fig. 6. Fig. 8 is a vertical section on the line $X^3$ $X^3$ of Fig. 6, looking from the left toward the right with respect to Fig. 1. Fig. 9 is a vertical section through the pivoted table on the line $X^4$ $X^4$ of Fig. 2, looking from the left, with some parts broken away and others removed. Fig. 10 is a detail in vertical section through the stall-board which holds the die ends of the die-carriers in their normal or idle position. Fig. 11 is a similar view, taken at a different point, for showing the cam-lever and spring for operating the stall-gate. Fig. 12 is a plan view of a part of the stall-gate, detached. Fig. 13 is a horizontal section on the line $X^5$ $X^5$ of Fig. 10. Fig. 14 is a skeleton view, chiefly in plan, but partly in section, with some portions broken away and others removed, for showing the relation of the assembling-belt to the compression-box, into which the selected dies are assembled. Fig. 15 is a left-end elevation of the compression-box, shown in its relation to a part of the assembling-belt. Fig. 16 is a detail of one of the parts of the compression-box. Fig. 17 is an inside elevation looking outward at the compression-box and the assembled line of die-carriers, with some parts broken away and others removed. Fig. 18 is a section on the line $X^6 X^6$ of Fig. 17. Fig. 19 is a detail in perspective, showing the impression-material guide on the platen. Fig. 20 is a vertical cross-section of the machine on the line $X^7 X^7$ of Figs. 21 and 22, looking from the left, showing the pivoted table in its turned-down position in full lines and at a certain intermediate or pausing position in dotted lines for illustrating the distributing actions. Fig. 21 is a plan view of the top part of the machine with the pivoted table turned down into its distributing position or at an angle of ninety degrees to its horizontal or assembling position; and Fig. 22 is a rear view of a part of the machine when the pivoted table is turned down into its distributing position, as shown in Fig. 21, with some parts broken away and others shown in section.

For convenience, the following classification of reference letters will be observed, to wit:

$a$ and its powers, $a'$ $a^2$, &c., will be used to denote the parts of the fixed or main frame; $b$ and its powers, for the constantly running shaft, cams, &c.; $c$ and its powers, for the parts of the pivoted table, the die-carriers and the assembling and distributing devices carried on the table; $f$ and its powers, for the parts of the compression-box, &c.

It may also be here noted, that in the following detailed description, the parts of the machine will be specified, not necessarily in the order of their operation, but in that order thought to be most conducive to ease of understanding and brevity of statement.

*The main frame.*—(See Figs. 1, 2, 3 and 4.) The main frame may be of any suitable construction; and is shown as composed of vertical end castings $a$, tied together by horizontal rods $a'$ and a top-bar $a^2$ connecting the upper ends of the said end castings at the front only. This arrangement affords the necessary clearance between the said end castings of the frame, for the pivotal movement of the die carrier table, as will presently more fully appear. To the body portions of the main frame are secured various other fixed parts, such as vertical bearing plates $a^3$ and $a^4$ fixed to the end castings, and the standard $a^5$ rising from the right hand corner of the front cross-bar $a^2$.

*The constantly running shafts, cams, &c.*— See Figs. 1 to 8 inclusive. In suitable fixed pillow-block bearings $b$, beyond the left end of machine frame, as shown, is mounted a transverse counter-shaft $b'$, having a pulley $b^2$ engaged by a belt $b^3$, which is kept in constant motion from a source not shown. The shaft $b'$, is provided with a worm $b^4$, which engages with a worm gear $b^5$, fixed to a counter-shaft $b^6$, which extends lengthwise of the machine and is mounted, as shown, in suitable fixed pillow-block bearings $b^7$. The shaft $b'$ has also fixed thereto a relatively large pulley $b^8$ which is connected, by belt $b^9$, with a pulley $b^{10}$, journaled in suitable bearings $b^{11}$, at the upper right hand corner and on the inside of the main frame, as shown in Figs. 1 and 3; and this belt $b^9$ is subject to a belt tightener $b^{12}$, adjustably secured to the left end casting of the main frame. This belt $b^9$, at the point where it passes over the pulley $b^{10}$, constitutes a friction driver for the assembling belt, as will later more fully appear. On the countershaft $b^6$ are located, at the left, two cams $b^{13}$ $b^{14}$, on a common hub $b^{15}$, which is adjustably secured to the shaft $b^6$ by a jam-screw $b^{16}$ or in any other suitable way. On the said shaft $b^6$, between the frame castings $a$, is also fixed a cam $b^{17}$ with propeller blade cam surfaces $b^{18}$. The said cams $b^{13}$ $b^{14}$ $b^{17}$ are used in the distributing action, as will later more fully appear. Near the right end of the shaft $b^6$ is located a cam driving disk $b^{19}$, which is fixed to the shaft $b^6$ and is provided with shoulders or steps $b^{20}$ on its periphery. Alongside of the driving disk $b^{19}$ and loose on the shaft $b^6$, is located a large cam $b^{21}$ having a profile stud $b^{22}$, which carries a pair of gravity acting independent pivoted pawls $b^{23}$ and $b^{24}$, which serve to effect the driving connection with the disk $b^{19}$. The pawl $b^{23}$ always engages with the periphery of the disk $b^{19}$; and the pawl $b^{24}$, which is the driving member, may be made to engage therewith, at will. The driving pawl $b^{24}$ has a lateral lug $b^{25}$, which is normally engaged by the lower arm $b^{26}$ of a pivoted bell-crank lever $b^{26}$ $b^{27}$, the long arm $b^{27}$ of which extends to and is connected with a vertically movable hand slide $b^{28}$ $b^{29}$ which embraces and is movable upon a vertical guide $b^{30}$ fixed to the front of the main frame. The angular end of the lower arm $b^{26}$ of said bell-crank trip-lever works through a slot $b^{31}$ in the bar $a^3$, fixed to the right end frame casting $a$. Hence, when the trip is in its lowermost position, the driving pawl $b^{24}$ will be held out of engagement with the driving disk $b^{19}$; but when the trip lever is raised, the said pawl $b^{24}$ will fall, by gravity, onto the periphery of the constantly running driving disk $b^{19}$, and as soon as it engages with any one of the shoulders $b^{20}$ of said disk, the cam $b^{21}$ will be locked to the disk and made to turn therewith, for one complete revolution and will, then, be unlocked from the disk by the lower arm $b^{26}$ of the trip-lever which will engage the lateral lug $b^{25}$ on the driving pawl $b^{24}$ and lift the same away from the driving disk $b^{19}$. The purpose of the pawl $b^{23}$ is to prevent the cam $b^{21}$ from moving ahead of the disk $b^{19}$, at any time, when the pawl $b^{24}$ is in driving engagement with the said disk. The spaces between any pair of the disk lugs $b^{20}$ are such that whenever the driving pawl $b^{24}$ is in engagement with the face of one of said lugs, the pawl $b^{23}$ will be in engagement, or directly behind the back of the next adjacent forward member of said lugs. Hence, the loose cam $b^{21}$ can never fall forward, with respect to the driving disk $b^{19}$; and it will never fall backward, with respect to said disk, when the driving pawl $b^{24}$ is unclutched therefrom, because the strain, which will, at that time be on the cam, will be radial to the center of the shaft $b^6$, as will presently more fully appear, and may be seen on reference to Fig. 3. The cam $b^{21}$ is always engaged by a roller $b^{32}$, on a strong cam-lever $b^{33}$, having its lower end pivoted to the main frame, as shown in Fig. 3, and provided with a sector gear $b^{34}$, at its upper end, for holding the pivoted table $c\ c'\ c^2$, &c., and controlling the movement of the same, as will presently more fully appear.

Before dropping consideration of the cam $b^{21}$, it should be noted, that it has, near the heel of the cam, a short surface $b^{21\frac{1}{2}}$ which is concentric with the shaft $b^6$; and hence, for a short part of the said cam's travel, the cam-lever $b^{33}$ will receive no pivotal movement. This produces a stationary point or interval of pause for the pivoted table, on its downward travel. The importance of this will appear when considering the distributing action.

*The pivoted table, the dies, and assembling devices.*—See Figs. 1, 2, 3, 4 and 9 to 19 inclusive. The so-called pivoted table $c\ c'$, &c., above referred to, is in reality, a skeleton-like frame, but has been called a table, on account of its functions and for distinction, with respect to the main or fixed frame of the machine. All the parts of this frame or table are supported directly or indirectly from a trunnion-shaft $c$, journaled in bearings on the top of the main frame, and having, at its right end, a sector-gear $c'$ rigid with the said shaft and in engagement with the sector-gear $b^{34}$ on the cam-lever $b^{33}$, which is under the control of the cam $b^{21}$ hitherto noted. The said cam $b^{21}$, when idle, holds the table horizontal or in its assembling position. Angular like end brackets $c^3$ are fixed to the said trunnion shaft $c$, points downward, and have attached to their upper ends, transverse end-bars $c^4$, connected by a rear side-rail or bar $c^5$ and top-rails or bars $c^6\ c^7$. On the shaft $c$ are fixed a pair of two-armed brackets $c^8\ c^9$, of which arms, the members $c^9$ project to the front of the machine and support a bottom rail or bar $c^{10}$, and, by the aid of bracket-irons $c^{11}$, also support a pair of vertical posts $c^{12}$, which extend to and are rigidly connected with the end rails or bars $c^4$ of the table. By the angular end-brackets $c^3$, the posts $c^{12}$, the bottom-bar $c^{10}$ and the bearing brackets $c^8\ c^9$, all the fixed parts of the pivoted table, are supported from the trunnion shaft $c'$ and held rigid therewith and with each other. The vertical parts $c^8$ of the brackets $c^8\ c^9$, form inside bearings for roller or drum-shafts $c^{13}$, the rear ends of which are journaled in bearing pieces $c^{14}$, depending from the rear rail $c^5$ of the table. On the said shafts $c^{13}$ are fixed rollers or drums $c^{15}$, on which are encompassed and traversed by an assembling belt $c^{16}$. On account of the way in which the bearings $c^8$ are obtained for the front portions of the drum-shaft, the drums $c^{15}$ are in two sections each and the belt $c^{16}$ is also in two sections; and the bearings $c^8$ have formed integral therewith a filling piece $c^{17}$, which rises therefrom to the level of the top face of the belt. If the front bearings for the drum shafts were obtained in such a way as to be at the front ends of the shafts, the assembling belt might be, and preferably would be, a single transversely continuous belt.

When the pivoted table is horizontal, the assembling belt $c^{16}$ will be horizontal and the under surface of the same, at the right hand front corner thereof, will be in frictional contact with the constantly running driving belt $b^9$, at the point where it passes over the pulley $b^{10}$; and hence, by this friction driver $b^9$, on the main frame, the assembling belt $c^{16}$ will receive motion whenever the table is in its horizontal or assembling position. This motion of the assembling belt $c^{16}$ is at a high rate of speed. In virtue of the relation of the friction driver or parts $b^9$ and $b^{10}$, on the main frame, to the assembling belt $c^{16}$, on the pivoted table, the said belt $c^{16}$ will only receive motion when in assembling position; or otherwise stated, the assembling belt $c^{16}$ will stop running, the instant that the table begins to turn downward.

At the front of the assembling belt and substantially at right angles thereto, are located a series of die carrier guides $c^{18}$, which, as shown, are in the form of rods secured, at their upper ends, to the front bar $c^7$ of the table, and, at their lower ends, to the bottom bar $c^{10}$ of the table. These guide-rods $c^{18}$ are, in number, sufficient for all the different sets of font elements or die-carriers, spacers, &c., which are used in the machine; and the said guide-rods $c^{18}$ are substantially parallel with each other and stand substantially in a common plane extending in the direction of the travel of the assembling belt and cutting the plane of said belt. To the said guides $c^{18}$ are pivoted a series of sets of die-carriers $c^{19}\ c^{20}\ c^{21}$; of which parts, $c^{19}$ are the carrier-stems, $c^{20}$ are the pivot-lugs and $c^{21}$ are the dies. The pivot-lugs $c^{20}$ of the die-carriers are offset from the carrier-stems $c^{19}$, as best shown in Fig. 14, in order to permit the carriers to be swung into a common plane parallel with and adjacent to the plane of the carrier-guides $c^{18}$. The dies $c^{21}$ are also offset from their carrier-stems $c^{19}$, in order to permit the feet of the dies to be engaged by a banking and clamping-plate of the compression box $f\ f'$, &c., when in the line of assembly, as will hereinafter more fully appear. The die-carriers and dies are, in number of sets, equal to all the elements of a complete font, for upper and lower case letters and numbers, punctuation-marks, &c.; and a sufficient number of compressible or spring spacers $c^{22}$ are also provided, for use with the other elements of the font, and are mounted on the same kind of pivoted carrier-stems $c^{19}$ as the dies $c^{21}$. Each set of dies or other elements of the font contain as many duplicates or members of the same element, as may be necessary to provide for any line of composition. As the machine is organized, provision is made for ten elements in a set. Each set of the carriers $c^{19}$ have a separate number of the guides $c^{18}$ for their pivoted ends or parts; and the carrier-stems $c^{19}$ are of unequal length, as best shown in Figs. 14 and 17, in order to bring the dies $c^{21}$ into a common line of assembly, notwithstanding the fact that the carrier guide-rods $c^{18}$ are located at different distances from the line of assembly.

By reference to Figs. 1 and 9, it will be seen that the guides $c^{18}$, for the die carriers $c^{19}$ extend both above and below the top face of the assembling belt $c^{16}$. The compression-box $f$ $f'$, &c., for the selected and assembled dies, is located on the main or fixed frame of the machine below the top level of the assembling belt $c^{16}$, at the front side of the same, and substantially in the plane of and parallel to the guides $c^{18}$, as may be best seen on reference to Figs. 1 and 14. The structure of said compression-box will be described later on.

The die carriers $c^{19}$ are all normally held above the assembling belt $c^{16}$, as shown in Fig. 9, when the pivoted table is in its horizontal or assembling position. The said carriers are thus held in their idle or normal position by suitable detents comprising a stall gate $c^{23}$, holding up the die ends of the carriers and releasing spring-catches $c^{24}$, holding up the pivot-lug ends of the carriers.

The releasing spring catches $c^{24}$, normally underreach the lowermost members of the sets of die carriers. For co-operation with the releasing spring catches $c^{24}$, corresponding cut-off spring catches $c^{25}$ are provided; which cut-off catches $c^{25}$ normally stand clear of the die carriers but may be forced inward, so as to engage under the next to the lowermost or penultimate members of the sets of die carriers. The cut-off spring catches $c^{25}$ are provided with cam-lugs $c^{26}$, and the releasing catches $c^{24}$ are provided with cam-lugs $c^{27}$. The co-operation of the spring-catches serve as an escapement feed for the type-carriers.

Spring up-held pivoted key-levers $c^{28}$ are provided for every set of the die carriers or font elements; and each of these key-levers is provided, at is forward end, with a downwardly projecting cam-lug $c^{29}$ of foot-like shape at its lower end, for operation on the spring catches $c^{24}$ and $c^{25}$. Under the down stroke of any key the toe of the cam-foot $c^{29}$ acts first, on the lug $c^{26}$ of the cut-off catch $c^{25}$, to force the said cut-off under the next to the lowermost or penultimate member of that set of carriers $c^{19}$, and the heel of the cam-foot $c^{29}$ acts, next, on the lug $c^{27}$ of the releasing spring-catch $c^{24}$ to force the same outward and release the lowermost member of the set of carriers controlled by that particular key, after the cut-off catch $c^{25}$ has been forced inward, where it will hold up all the other carriers of that set until the up stroke of the key and the return of the releasing catch $c^{24}$ to its normal or holding up position. Hence, whenever a downward stroke is given to one of the key-levers $c^{28}$, the lowermost member of the set of carriers $c^{19}$ controlled by that key, will be released at its forward or pivoted end; and will fall, by gravity, onto the assembling belt $c^{16}$, as shown in Fig. 9. The initial drop of the pivoted end of the released carrier on its guide, is sufficient to pull the die end of the guide $c^{18}$, before the pivot lug thereof will cramp and bind on its released carrier off from the stall gate $c^{23}$. Hence, whenever one of the carriers $c^{19}$ is thus released, by the down stroke of one of the key-levers, it will instantly fall by gravity onto the top of the assembling belt; and inasmuch as its forward end is pivoted to its guide $c^{18}$ and the die end is free, the die end of the released carrier will be carried forward by the belt and be swung off from the side of the same, when carried to its limit, so as to come into the assembling plane, as shown in Fig. 14. As quick as the die end of the released carrier is thus swung off from the belt, the whole carrier may fall downward, parallel with its guide $c^{18}$, into the line of assembly of the compression-box $f f'$, &c., as shown in Figs. 14, 17 and 18. In its downward movement below the level of the belt, the released die-carrier is guided, at its free or die end, by a stationary vertical guide $c^{30}$ rising from a fixed part of the compression-box $f f'$, as best shown in Figs. 14 and 15. In this way, all the dies and spaces selected and released, by the operator, at the key-board, are brought into a common line of assembly, at the compression-box $f f'$, &c. The next step of the action, in point of time, is to clamp the assembled dies together into a justified line, and take an impression therefrom, by the operation of the parts of the compression-box; but before considering this branch of the subject, it will be most convenient and conductive to distinctness, to describe the additional devices which co-operate with the pivoted table for distribution or return of the released and assembled line of die carriers, back into their initial or idle positions. For present purposes, therefore, let it be assumed, that the impression from the assembled line of dies has been taken and that the said assembled die carriers stand free from the clamps of the compression-box and ready to be distributed.

*The distributing devices.*—See Figs. 1 to 4 and 9 to 22. The vertically movable hand slide $b^{28}$ $b^{29}$, at the front of the machine, which operates the trip lever $b^{26}$ $b^{27}$, for throwing the table controlling cam $b^{21}$ into engagement with the constantly running driving disk $b^{19}$, as hitherto noted, bears at its upper end against a die carrier lifting and returning bar $c^{31}$. This bar is $c^{31}$ is mounted for sliding movement on the die carrier guide rods $c^{18}$, and also has attached thereto, by bracket irons $c^{32}$, bearing sleeves $c^{33}$ which ride on the table rods $c^{12}$. These double bearings for the lifting and returning bar $c^{31}$ insure the maintenance of the same, always level, when traversing the die carrier rods $c^{18}$. The lifting and returning bar $c^{31}$ is thrown to its lowermost limit, before the operator begins to assemble the line, and will underlie the lowermost member of the assembled line of die carriers, as best shown in Fig. 17. Hence, after the line has been assembled, and clamped together in the compression-box and the impression taken therefrom, said bar $c^{31}$ may be used first to lift the assembled die carriers to a point above the level of the top of the belt, before the table begins to turn, and, finally, to return the pivoted ends of the same into their distributed or idle positions on their guide rods $c^{18}$ as will later appear. The first action or vertical lift of the bar $c^{31}$ is effected by the hand slide $b^{28}$ $b^{29}$, before noted. The lifting bar $c^{31}$ has stud and slot connection, as shown at $c^{34}$, Fig. 1, with the inner end of a cam lever $c^{35}$ pivoted to the left end bracket of the table, and having a segmental arm $c^{36}$ adapted to be engaged and acted upon by a lateral pin $c^{37}$ on a cam-lever $c^{38}$, at the proper time, in the downward movement of the pivoted table. The cam lever $c^{38}$ is pivoted to a stud $c^{39}$ and is subject to the action of a spring $c^{40}$ which normally holds the lower end of said cam lever $c^{38}$ against the cam $b^{13}$ on the left end of the shaft $b^{6}$. On the downward movement of the pivoted table, the segmental arm $c^{36}$ meets the pin $c^{37}$ of the cam lever $c^{38}$, before the high part of the cam $b^{13}$ begins to act on said lever; and the pivotal motion of the table will serve to cause the parts $c^{37}$ and $c^{36}$ to rock the lever $c^{35}$ and move the lifting and returning bar $c^{31}$ nearly but not quite to the limit of its upward or distributing stroke on the carrier guide $c^{18}$.

The releasing spring catches $c^{24}$ depend from a common support $c^{41}$ which is pivoted to the table frame, as shown in Figs. 1 and 9, and is normally held in its innermost position by springs $c^{42}$; but said pivoted spring catch support $c^{41}$ has at its left corner a projecting arm $c^{43}$ which, at the proper time in the downward movement of the table, strikes a cam-lug or post $c^{44}$ rising from the machine frame; and under the action of said parts $c^{43}$ and $c^{44}$, the support $c^{41}$ and the releasing spring catches $c^{24}$ will be thrown away from the carrier guides $c^{18}$ so as to afford clearance for the upward passage of the lowermost die carrier to a point above the normal position of said spring catches $c^{24}$. Just after the pivoted support $c^{41}$ and its spring catches $c^{24}$ are thus thrown outward, one of the high parts of the cam $b^{13}$ acts on the lower end of the cam lever $c^{38}$ and through the parts $c^{37}$ $c^{36}$ $c^{35}$, completes the distributing stroke of the lifting and returning bar $c^{31}$, thereby returning the pivoted ends of the die carriers to initial or idle position on their guide rods $c^{18}$; and as quick as the table starts back, the arm $c^{43}$ will leave the lug $c^{44}$ and permit the springs $c^{42}$ to throw the releasing catch support $c^{41}$ and catches $c^{42}$ back into their normal position so as to hold the sets of die carriers in their normal or idle positions, under the further upward movement of the table and until again released by the key actions. The final part of the distributing stroke of the lifting bar $c^{31}$ was made against a stiff spring $c^{31\frac{1}{2}}$, as shown in Figs. 1 and 21; which spring $c^{31\frac{1}{2}}$ serves to throw said bar down out of the path of the closing catch $c^{24}$, as quick as permitted by the cam $b^{13}$.

Some other parts, besides those above named, co-operate in returning or distributing the pivot lug ends of the die carriers; but they may be best noted later on. It may be here added, however, that a spring clamp finger $c^{10\frac{1}{4}}$ rising from the front lower rail of the table serves to hold the lifting bar $c^{31}$ from falling, when raised by hand to a point above the level of the assembling belt. After the table has been returned to its normal or assembling position the lifting bar $c^{31}$ must be lowered to its limit by hand, before beginning to assemble the next line.

Having regard to the return of the die ends of the die carriers, attention may first be directed to the stalls $c^{45}$ entrance to which is controlled by the stall gate $c^{23}$, hitherto noted, as shown in Figs. 2, 4, 9 to 13 and 20 and 22. The said stalls $c^{45}$ are formed by partition blades $c^{46}$ driven into what may be called the stall-body plate $c^{47}$, which is provided with a cap-plate $c^{48}$, extending forward over the upper ends of the stalls $c^{45}$. The stall body plate $c^{47}$ and the cap-plate $c^{48}$ extend diagonally across the top of the pivoted table and are rigidly secured to, the front and rear rails thereof, as best shown in Fig. 2. Angle-irons $c^{49}$ are fixed to the back of the stall body plate, with the lower arms of which engage keepers $c^{50}$ fixed to the stall gate $c^{23}$ as shown in Fig. 10. The stall gate $c^{23}$ is also provided with two sets of lugs $c^{51}$, which are engaged by the lower arms of pivoted levers $c^{52}$, which are mounted on and rigid with a shaft $c^{53}$, which is journaled in bearings $c^{54}$, fixed to the back of the stall-body plate $c^{47}$. The levers $c^{52}$ and shafts $c^{53}$ are subject to the action of a spring or springs $c^{55}$, which tend to throw the stall gate $c^{23}$ toward the front so as to close the lower ends or mouths of the stalls $c^{45}$. One of the levers $c^{52}$, is, however, subject to an arm $c^{56}$ on a rock-shaft $c^{57}$, mounted in suitable bearings $c^{58}$, as best shown in Fig. 22, and provided at its left hand end with a cam-lever $c^{59}$, which rides on the cam $b^{14}$, fixed to the shaft $b^{6}$. The cam $b^{14}$ will impart to the lever $c^{59}$ and the parts $c^{57}$ and $c^{56}$ a constant rocking motion. As the table nears the lowermost limit of its downward movement, the upper or free arm of the stall gate lever $c^{52}$ will come into the path of the said cam rocked part $c^{56}$ and, thereby, the stall gate will be thrown to and be held in its rearmost position against the tension of the spring or springs $c^{55}$. This opens the lower ends or mouths of the stalls $c^{45}$, and the die ends of the die carriers $c^{19}$ having been brought into line with the mouths of said stalls, by means which will presently be noted, they will under the action of gravity enter said open stalls at the very final limit of the table's downward movement. As quick as the table starts back upward, the gate lever $c^{52}$ will move away from the cam rocked arm $c^{56}$, and the spring $c^{55}$ will restore the stall gate to its closed position and hold the die ends of the carriers in their respective stalls until again released by the key actions.

Near the right hand front corner of the table frame, is mounted an angular piece $c^{60}$, which, on account of its function, may be called the temporary retainer, for the die-carriers, inasmuch as it serves to prevent any pivotal motion of the die carriers, during the time that the said carriers are being lifted above the level of the belt, and during the time that the table is being turned over to the point where it has a period of pause. The said retainer may be best seen in Figs. 1, 2, 3, 14, 17, 18 and 21. The horizontal part of the said retainer $c^{60}$ is mounted in keepers $c^{61}$ on the table-frame, and is under tension from a spring $c^{62}$, as shown best in Fig. 2, to move inward to its limit; but when the table is in its horizontal or assembling position, the outer end of the horizontal part of said retainer $c^{60}$, which is hook shaped on its under edge, will be engaged by a small cam $c^{63}$ which is mounted for sliding movement on the standard $a^5$ of the fixed frame and carried on the upper end of the vertical arm $c^{64}$ of levers $c^{64}$ $c^{65}$, which is pivoted to a bracket $c^{65\frac{1}{2}}$, fixed to the main frame, as shown in Fig. 1, and has its horizontal arm $c^{65}$ connected to the hand slide $b^{28}$ $b^{29}$ at the front of the machine. When the said cam $c^{63}$ is in its uppermost position, where it is thrown before the table returns to its horizontal or assembling position, the hooked end of the horizontal part of the retainer $c^{60}$ will, under the upward movement of the table, engage the said cam $c^{63}$ and draw the said retainer $c^{60}$ outward against the tension of its spring $c^{62}$; and the vertical or active part of said retainer $c^{60}$ will then stand, as shown in Figs. 1, 2, 14 and 18, at a point out of the path of the die carriers, when swinging into the line of assembly; but, when the hand slide $b^{28}$ $b^{29}$ is lifted to start the distributing action, the cam $c^{63}$ will be drawn down away from the hooked end of the retainer $c^{60}$ and the spring $c^{62}$ will instantly throw the said guide inward, so as to cause the vertical part of the same, to assume the position shown in dotted lines in Fig. 18, and stand at a point directly opposite the die ends of the carriers $c^{19}$. Hence, when the assembled die carriers are lifted above the belt, and the table begins to turn over, the die ends of the carriers will be caught and held by said retainer $c^{60}$ from any except a very limited pivotal movement on their guide rods $c^{18}$. When the table reaches the proper point, in its downward movement, which is just about at the place where it begins to stand still, for a short interval, the hook end of the retainer $c^{60}$ will be engaged by a segmental cam $c^{66}$, rising from the right hand rear corner of the machine frame, as best shown in Figs. 2, 3 and 21; and the said retaining guide will, thereby, be pulled out from under the die ends of the said carriers $c^{19}$, and will be held, in that position, during the remainder of the downward movement of the table. When the die ends of the carriers $c^{19}$ are thus released from the retainer $c^{60}$, they will be free for pivotal movement on their guides $c^{18}$, under the action of gravity; and owing to the position of the table, which will then be nearly turned over, the said die carriers $c^{19}$ will assume a position crosswise of the assembling belt and substantially at right angles to their guides $c^{18}$. The said die carriers, will, however, at that time or immediately thereafter, be caught by the assembling belt, as shown in dotted lines in Fig. 20, which fact, together with the stationary position of the table, will prevent any undue vibration of the die-carriers; or otherwise stated, this action of the belt will bring the die-carriers substantially to a point of rest on the assembling belt, until the further movement of the table in its downward travel.

A stall aligning or abutment board $c^{67}$ extends diagonally across the pivoted table, as best shown in Figs. 2, 3, 20 and 22, with its lower edge just clearing the top level of the assembling belt. This abutment board $c^{67}$ has its ends mounted for sliding movement on suitable guide rods $c^{68}$, extending lengthwise of the table frame. A link $c^{69}$ connects the rear end of the said abutment board with the long arm of a bell crank cam lever $c^{70}$ $c^{71}$ pivoted to the table frame as shown at $c^{72}$. The spring $c^{73}$, as shown, connects the long arm $c^{70}$ of said bell crank lever with the right end of the table frame and normally holds the abutment board $c^{67}$ at the extreme right hand of its movement, or in the position shown in Fig. 2, where it will stand when the table is horizontal or in its assembling position, entirely out of the path of the die carriers, when under the action of the assembling belt. The lower arm $c^{71}$ of the said bell crank lever $c^{70}$ $c^{71}$ has a roller $c^{74}$; and, at the proper time, in the downward movement of the table, the said roller $c^{74}$ will engage one of the propeller blades or cam surfaces $b^{18}$ of the constantly running cam $b^{17}$; and, thereby, the said abutment board $c^{67}$ will be thrown toward the left, lengthwise of the assembling belt, against the tension of the spring $c^{73}$. This leftward movement of the abutment board $c^{67}$ begins at the proper time to bring the abutment board in the proper position, for co-operation with the assembling belt, at the time just after the die ends of the carriers are released from the retainer $c^{60}$ and are caught by the belt, or when in the position shown in dotted lines in Fig. 20. The movement of the abutment board $c^{67}$ then continues toward the left, during and after the interval when the table is standing stationary, and will move all the die carriers requiring distribution to a point where the die ends of the same will be directly in line with their respective stalls $c^{45}$. A fixed stop-arm $c^{75}$ limits the leftward movement of the die carriers $c^{19}$. At or about the same time that the abutment board $c^{67}$ brings the dies into line with the stall mouths, or directly thereafter, under the further downward movement of the table, the stall gate $c^{23}$ is thrown into its open position, by the means hitherto noted, and the pivoted plate carrying the releasing catches $c^{24}$ is thrown outward, by the means hitherto noted; and clearance is, thereby, afforded, so as to permit the die ends of the carriers to enter their respective stalls $c^{45}$, under the action of gravity at the final downward step of the table's movement, and to permit the forward or pivoted ends of the die-carriers to be thrown into their final or distributed position, on their respective guide $c^{18}$, by the lifting and returning bar $c^{31}$, as hitherto noted. As quick as the table begins to return upward, the stall-gate $c^{23}$ and the releasing detents $c^{24}$ assume their normal positions, so as to hold all the die carriers in their distributed or idle initial positions, as hitherto noted. On the continued movement of the cam $b^{21}$, the pivoted table will be returned to its horizontal position and all the parts carried thereby will assume their normal positions, ready for use, under the key actions, to assemble another line. Before action, for the next line, is begun, however, the lifting and returning bar $c^{31}$ must be thrown down by hand to its lowermost limit, as hitherto noted.

The question may arise in the reader's mind, as to what prevents the entire sets of die-carriers, which were left unused in their idle or normal positions, falling therefrom at the time that the releasing detents $c^{24}$ are all thrown outward away from the lowermost members of said carriers; and if such a question has arisen, the answer will be found by reference to Fig. 20, wherein it will be seen that the said die-carriers are then substantially vertical and their guide-rods $c^{18}$ substantially horizontal, so that there is no tendency of the carriers to move away from their initial or distributed position.

The pivoted table is turned up by the cam $b^{21}$ against a fixed stop $c^{76}$.

*The compression-box or line holding and impressing devices.*—See Figs. 1, 2 and 14 to 20 inclusive. Returning now to the consideration of the compression-box, or devices for clamping the assembled dies together into a justified line and taking an impression therefrom, it may be first noted that the fixed or body plate $f$ of the compression-box, is rigidly secured to the front rail $a^2$ of the fixed or main frame of the machine, as best shown in Figs. 1 and 17. This fixed plate $f$ is provided on its face with bearing-lugs $f'$, in which is journaled a hand operated rock-shaft $f^2$, provided with a hand-lever $f^3$. This shaft $f^2$ has various cams thereon, which will be noted, in connection with the parts operated thereby. In bearing-lugs $f^4$, projecting from the left end of the fixed plate $f$, is journaled a pivoted clamping plate $f^5$, for engaging with the feet of the assembled dies and afford a banking surface for the same. The said plate is provided with a cam-lever arm $f^6$, which extends outward toward the front and is subject to the action of a spring $f^7$ and a profile cam $f^8$ on the hand-shaft $f^2$. The spring $f^7$ normally holds the said clamping plate $f^5$, in the position shown in Fig. 14; but, when the hand-shaft $f^2$ is brought into action the cam $f^8$ will force the said clamping plate $f^5$ into the position shown in Fig. 18. To bearing-lugs $f^9$, depending from the left end of the fixed plate $f$, is pivoted a bell-crank cam-lever $f^{10}$, the inner arm of which has pivoted thereto a clamping plate $f^{11}$, for engagement with the inner side of the line of assembled dies and clamping the same against the front side banking surfaces of the fixed plate $f$. The forward arm of the bell-crank lever $f^{10}$ is provided with a roller $f^{12}$, which is subject to the action of a cam $f^{13}$ on the shaft $f^2$, for producing the clamping action of the plate $f^{11}$. The said cam-lever $f^{10}$ is subject to the action of a spring $f^{14}$, which normally holds the same in the position shown in Figs. 14 and 15, when the dies are being assembled. To the bell-crank lever $f^{10}$ is attached the lower end of a vertical rod $f^{15}$, which passes up through a part of the fixed plate $f$, and has attached to its upper end a clamping jaw $f^{16}$, which is normally held in its uppermost position by the lever $f^{10}$, as shown in Fig. 15. The said jaw $f^{16}$ is under tension from a spring $f^{17}$, to move toward the right into a position directly over the upper end of the assembled line of dies; but is also subject to the action of a vertically movable cam-rod $f^{18}$, as best shown in Figs. 14 and 16. The cam-rod $f^{18}$ is prevented from turning in its seat by a lateral stud $f^{19}$ thereon, engaging a groove $f^{20}$ in the rod seat. The curved upper end of the rod $f^{18}$ projects into the path of a stud-arm $f^{21}$, on the jaw-head $f^{16}$, whereby, when the rod $f^{18}$ is drawn down and held in its lowermost position, the clamping jaw $f^{16}$ will be held as shown in Fig. 14 out of the path of the dies, when moving into the line of assembly. The lower end of the cam-rod $f^{18}$ is provided with a lateral arm $f^{22}$, which is engaged by a stud $f^{23}$ on the hand shaft $f^2$, when the said shaft is held in its normal position, as shown in Fig. 14. The said shaft $f^2$ is thus held in its normal position, by a band spring $f^{24}$, one end of which is attached to the fixed plate $f$ or some other rigid part of the frame, and the other end of which is attached to the said shaft. When the shaft $f^2$ is rocked downward, as required for the compressing action, the band-spring $f^{24}$ is set under tension and will instantly return the said shaft to its normal position and hold the same there, as shown in Fig. 14, thereby holding the cam-rod $f^{18}$ in the position shown in Figs. 14 and 16. When the hand-lever $f^{3}$ is turned downward, the lug $f^{23}$ will turn upward, away from the arm $f^{22}$, and permit the cam-rod $f^{18}$ to be thrown upward into an idle position by a spring $f^{25}$ encircling the same as shown in Fig. 16; and when that occurs, the spring $f^{17}$ becomes active to draw the clamping-jaw $f^{16}$ toward the right, so as to stand directly over the top of the assembled line of dies; and hence, on the further downward movement of the hand-lever $f^{3}$, the bell-crank cam-lever $f^{10}$ will become operative to draw downward the clamping-jaw $f^{16}$ against the top member of the assembled dies and compressible spacers, and will serve to compress the same together into a justified line.

Having regard to the timing of the clamping actions, obtained respectively, from the die feet clamping or banking plate $f^{5}$, the end clamping jaw $f^{16}$ and the side clamping plate $f^{11}$, the clamp $f^{5}$, operates first and insures the alignment of the dies, and the members $f^{16}$ and $f^{11}$ move together, under the control of the common cam $f^{13}$ and bell-crank lever $f^{10}$, but the end clamp $f^{16}$ clamps slightly in advance of the side clamp $f^{11}$, so as to compress the assembled dies and spacers into the justified line, before the plate $f^{11}$ reaches its final clamping position. When all the said clamps $f^{5}$ $f^{11}$ $f^{16}$ are in their final clamping positions, the parts will appear, as shown in Fig. 18, and the assembled line of dies and spacers will be held rigid with the fixed part of the compression-box. A platen $f^{26}$ is mounted, for sliding movement, between horizontal guides $f^{27}$ on the back of the fixed plate $f$ of the compression-box. A toggle-lever $f^{28}$ connects the right end of the said platen $f^{26}$ with the right end of the fixed plate $f$. The toggle $f^{28}$ is normally held in the position shown in Fig. 17 by a spring $f^{29}$. The hand-shaft $f^{2}$ is provided with a camming arm $f^{30}$, which underreaches the toggle $f^{28}$ and serves, when the hand-lever $f^{3}$ is thrown downward, to raise the center joint of the toggle and force the platen $f^{26}$ toward the right, and bring the strip of matrix material $f^{31}$ against the faces of the justified and rigidly held line of dies, thereby producing the matrix in the said strip. The said strip $f^{31}$ runs through a flanged guide-clip $f^{31\frac{1}{2}}$, fixed to the left end of the platen, and traverses flanged guide wheels $f^{32}$ and $f^{33}$, as shown best in Fig. 17. The said strip $f^{31}$ is held under friction, against the face of the lower feed-wheel $f^{33}$, by a light pressure roller $f^{34}$, mounted in spring bearings $f^{34\frac{1}{2}}$.

As the feed devices are here shown, the lower wheel $f^{33}$ is positively driven in the direction shown by the arrows, while the upper wheel $f^{32}$ acts simply as an idler. Hence, the strip $f^{31}$ is, as shown, fed downward. The wheel $f^{33}$ is provided, on its projecting front journal, with a ratchet wheel $f^{35}$ rigid with the said journal; and on the outer end of the said journal is pivoted a driving lever $f^{36}$, having a driving pawl $f^{37}$, for engaging with the teeth of the said ratchet. A lock-pawl $f^{38}$, pivoted to the frame plate $a^{2}$, holds the ratchet $f^{33}$ wherever fed by the driving pawl $f^{37}$. The left end of the pawl-lever $f^{36}$ is connected by a coiled spring $f^{39}$ to a fixed lug $f^{40}$; and the right end of the said lever $f^{36}$ has connected thereto a cord or other flexible connection $f^{41}$, which passes down over a guide-sheave $f^{42}$, and then upward to a lug $f^{43}$ on the table frame, as shown in Fig. 3. The feeding stroke to the said pawl bearing lever $f^{36}$, is imparted by the said spring $f^{39}$, when permitted by the slack in the cord $f^{41}$; and the said feed stroke is limited by a stop-lug $f^{44}$ on the frame plate $a^{2}$. With this arrangement of the feed devices, for the strip $f^{31}$, the right end of the pawl bearing lever $f^{36}$ will be pulled down and the spring $f^{39}$ set under tension, every time that the pivoted table is raised upward into its horizontal or assembling position; and, whenever the table is turned downward, the cord $f^{41}$ will become slack and permit the spring $f^{39}$ to operate the pawl and ratchet, so as to turn the feed-wheel $f^{33}$ one step. There is nothing to hinder the feed of the said strip $f^{31}$, at said time, inasmuch as the platen $f^{26}$ will have been moved toward the right into its idle or normal position, before the table begins to turn. The form of feed mechanism shown in the drawings, above described, has been shown simply for purposes of illustration. In practice, I would use a feed which fed with a positive action, instead of the spring action above noted. In practice, also, provision would be made for supplying the strip $f^{31}$ and for taking care of the completed matrix. The strip $f^{31}$ may be of lead, paper, or of any other suitable material. I preferably employ a strip of paper, which is of a special composition, best adapted, according to my experience, for matrix purposes. This completes the consideration of the compression-box and the parts for taking the impression from the assembled dies.

The distributing devices, for the return of the assembled dies to their distributed or normal idle position on the pivoted table, have already been fully considered.

*The general operation.*—All the parts of my machine have now been specified, in detail, and the actions of the respective groups of mechanism have been traced in connection with the detailed description. It may, however, add further distinctness, to summarize the general actions of the machine, which may be briefly done as follows:—When the pivoted table is in its horizontal or assembling position, as shown in Figs. 1, 2, 3 and 4, the assembling belt will be in rapid motion; and, by operating the key-board, exactly as on a typewriting machine, the line of dies and spacers may be selected, released and brought into the common line of assembly at the compression-box. The operator will then throw down the hand-lever $f^3$, on the hand-shaft $f^2$ at the compression-box; which action will align and clamp the assembled dies and spacers rigidly together into a justified line and take the impression therefrom; and when the said lever is released, the assembled dies and spacers will again be free from the clamps and ready for distribution. The operator then raises the hand slide $b^{28}$ $b^{29}$, at the front of the machine; which action will trip the cam $b^{21}$ into driving connection with the constantly running driving disk $b^{19}$, will pull down the retainer cam $c^{63}$ so as to permit the retainer $c^{60}$ to move under the action of its tension spring, into its retaining position, and will lift the assembled line of dies and spacers to a point above the level of the assembling belt. The cam $b^{21}$ being thus started into motion, will permit the table to turn downward by gravity. When the roller $b^{32}$ of the sector gear cam-lever $b^{33}$ reaches the concentric part $b^{21\frac{1}{2}}$ on the moving cam $b^{21}$, the table will stand still for a short interval, which may be roughly stated to be for about thirty degrees of the cam shaft's movement. Just as the table reaches the point of pause, the hooked end of the retainer $c^{60}$ will be engaged by the fixed segmental cam $c^{66}$, rising from the machine frame, and the retainer will thereby be pulled out from under the pivoted ends of the carriers, which will permit the carriers to swing, on their guides $c^{18}$, to positions substantially at right angles to the assembling belt, and permit the die ends of the same to fall on to the belt, under the action of gravity owing to the position of the table at the time. Immediately after the withdrawal of the retainer from under the die ends of the carriers, just above noted, the arm $c^{36}$, on the lifting blade lever $c^{35}$, will have met and will be operated upon by the pin $c^{37}$ of the cam-lever $c^{38}$ while still on the low part of the cam $b^{13}$; and, under the pivotal motion of the table, the lifting bar $c^{31}$ will be lifted nearly but not quite to the end of its distributing stroke, or substantially into the position shown in Fig. 21. Immediately after and nearly simultaneously with the release of the die carriers from the retainer $c^{60}$, the roller $c^{74}$ of the bell-crank lever $c^{70}$ $c^{71}$, operating the abutment-board $c^{67}$, engages the propeller-cam $b^{17}$; and the said abutment board $c^{67}$ is, thereby, thrown toward the left, so as to meet the die ends of the carriers on the assembling belt, while the table is stationary, and co-operates with the idle belt to keep the die carriers from vibration at that time. The said abutment-board meets the die ends of the carriers, just as they strike the belt; and the movement of the said abutment-board, after having once begun, is continuous from the right toward the left, during about the last one-third of the table's downward movement. Just before the abutment board reaches the left hand limit of its travel, so as to bring the die ends of the carriers opposite their respective stalls, the gate-lever arm $c^{52}$ will, under the further downward movement of the table, come in contact with the rocker $c^{56}$ which is under the action of the cam $b^{14}$, through the parts $c^{59}$ and $c^{57}$, and, thereby, the stall-gate $c^{23}$ will be thrown into its open position. Simultaneously with the opening movement of the stall-gate $c^{23}$, the support $c^{41}$, carrying the releasing catches $c^{24}$, will be thrown outward by the cam-post $c^{44}$ meeting the support's arm $c^{43}$, under the pivotal motion of the table. Immediately thereafter, the high part of the cam $b^{13}$, will rock the cam lever $c^{58}$, and, through the parts $c^{37}$ $c^{36}$ $c^{35}$, force the lifting and returning bar $c^{31}$ to the final limit of its distributing stroke; and as quick as the high part of the cam $b^{13}$ passes the lever $c^{38}$, the spring $c^{31\frac{1}{2}}$, which was set under tension by the final stroke of the lifting-bar $c^{31}$, will throw the said bar $c^{31}$ backward on its guides, so as to afford clearance for the subsequent closing movement of the catches $c^{24}$. At the time when the table reaches the limit of its downward travel, the pivoted ends of the carriers will have already been thrown into their final distributing positions on their guides, as above noted; and the lower ends or mouths of the stalls $c^{45}$ being open, as above noted, and the abutment board having brought the die ends of the carriers exactly in line with their respective stall mouths, the die ends of the carriers will enter the stalls, under the action of gravity, at the final limit of the table's movement, which is slightly beyond the vertical line. The table will then begin its return or upward movement, under the action of the cam $b^{21}$ and the sector-gears $c'$ and $b^{34}$. As soon as the table starts upward, the stall gate will be closed by its spring and the support $c^{41}$ will be drawn inward by its spring $c^{42}$; and, by the said movements, the parts $c^{24}$ and $c^{23}$ will be in position to hold the distributed and all other members of the carriers $c^{19}$ in their idle or initial positions. During the return movement of the table, the abutment-board $c^{67}$ is returned to the right, into its normal position, by the spring $c^{73}$. Just as the table reaches the limit of its upward movement, the hooked end of the retainer $c^{60}$ will engage the cam $c^{63}$, so as to force the said retainer into its outward position to the right of the line of assembly. Just as the table reaches its upward limit, the driving pawl for the cam $b^{21}$ will also be tripped out of action, by the trip-lever $b^{26}$ $b^{27}$; and, thereafter, the said cam $b^{21}$ will hold the table stationary in its horizontal or assembling position. The operator must then force the lifting bar $c^{31}$ to its lowermost position; and all the parts of the machine will, then, be ready for action at the key-board, by the operator, for the release and assembling of the next line of dies.

All the statements of facts hereinbefore made, as to the actions of the different parts of my machine, have been based on actual experience with a full sized working machine, from which the accompanying drawings were made.

It will, of course, be understood, that many changes might be made in the details of construction, without departing from the spirit of my invention.

It should here be noted that, throughout the specification and in the accompanying claims, the word "dies" is used in a sense broad enough to include the compressible spring spacers and all the other elements of the font, of whatever kind they may be, which are mounted on the carriers $c^{19}$ and which may be moved into and out of the line of assembly by the assembling and distributing devices herein disclosed.

It will be understood, of course, that various alterations in the details of construction of my invention, as well as various substitutions of certain equivalent mechanical elements, may be made without departing from the spirit of my invention.

What I claim, and desire to secure by Letters Patent of the United States, is as follows:

1. The combination with a bank of keys, of pivoted die-carriers releasable by said keys, and an endless traveling assembler adapted to receive the free ends of said carriers, when released, and to swing the same into a common line of assembly, substantially as described.

2. The combination with a bank of keys, of pivoted die-carriers releasable by said keys and an assembling belt adapted to receive the free ends of the released carriers and swing the same into a common line of assembly, substantially as described.

3. The combination with a bank of keys, of a corresponding series of sets of pivoted die-carriers, guides for the pivoted parts of said sets of die-carriers, key controlled detents normally holding said carriers in an idle position, and an assembling belt adapted to receive the free ends of the released die carriers and swing the dies into a common line of assembly, substantially as described.

4. The combination with a bank of keys, of a corresponding series of sets of pivoted die-carriers, the different sets of which have stems of unequal length, separate guides for the pivoted parts of each set of said die carriers, located at different distances from the line of assembly, key controlled detents normally holding said carriers in an idle position and an assembling belt adapted to receive the free ends of said carriers, when released, and swing the dies into a common line of assembly, substantially as described.

5. The combination with a bank of keys, of a corresponding series of pivoted die carriers, guides for the pivoted parts of said carriers, key controlled detents normally holding said carriers in an idle position, an assembling belt for swinging the die ends of the released carriers into a common line of assembly and a compression-box for receiving the assembled dies, clamping the same into a justified line and taking the impression therefrom.

6. The combination with a bank of keys, of the corresponding series of sets of pivoted die-carriers, having their pivot lugs and their dies offset from the carrier stems and having stems of unequal length, separate guides, for the pivot-lugs of each set of said die carriers, located at unequal distances from the line of assembly and substantially parallel therewith, key controlled detents normally holding said carriers in an idle position, an assembling belt for receiving the free ends of the released carriers and swinging the dies into a common line of assembly and a compression-box for receiving the assembled dies clamping the same together into a justified line and taking an impression therefrom, substantially as described.

7. The combination with an assembling belt, which is horizontal when in working position, of a series of carrier guides at one side of and substantially at right angles to said belt, a series of die-carriers pivoted to said guides, key controlled detents normally holding said die-carriers above the belt, and a compression-box, for the assembled dies, located on the carrier-guide side of the belt and below the face level of the same, for the assembling of the released dies under the cooperation of gravity and the belt action, substantially as described.

8. The combination with a die-carrier supporting table or frame, which is movable from a die-assembling into a die-distributing position, and vice versa, of an assembling belt carried by said table or frame, which belt receives motion only when said frame or table is in its assembling position, substantially as described.

9. The combination with a relatively fixed main frame, of a die carrier supporting table, which is movable on said fixed frame from a die assembling to a die distributing position and vice versa, and a friction driver on the fixed frame in position to engage and drive said belt by frictional contact when in assembling position only, substantially as and for the purposes set forth.

10. The combination with a main frame, of a table pivoted thereto and movable from a horizontal or assembling position to a vertical or distributing position, an assembling belt on said table horizontal when in assembling position, a series of die-carrier guides on said table at one side of and substantially at right angles to said belt, a series of die-carriers pivoted to said guides, a bank of keys, key controlled detents normally holding said carriers in an idle position above said belt when horizontal, a friction driver on the main frame engaging said assembling belt when in assembling position only, a compression box below the face level of the belt and on the carrier guide side of the same, for assembling the dies, under the cooperation of gravity and said belt action, and distributing devices for returning the used die-carriers to their normal or idle position, under the cooperation of gravity and the pivotal movement of said table and belt when idle, substantially as described.

11. The combination with a bank of keys, of die-carrier guides, die-carriers mounted on said guides, for pivotal and sliding movement, retaining stalls holding the free or type ends of said carriers, and escapement catches normally engaging under the pivoted ends of said carriers, and adapted to release the same, one by one, under the action of the keys, substantially as described.

12. The combination with the bank of keys, of the series of die carrier guides, the series of sets of die-carriers pivoted one set to each of said guides and the key controlled detents for the pivoted ends of said carriers, comprising releasing spring catches normally underreaching the lowermost member of each set of die carriers and movable away from the same by the releasing stroke of the keys and cut-off spring catches, one for each set of carriers normally standing clear of the same but engageable under the penultimate member thereof under the releasing stroke of the keys before the releasing catch is disengaged from the lowermost member, substantially as described.

13. The combination with the die carrier guides and the series of sets of die carriers pivoted one set to each of said guides, of the detents for holding the carriers in their idle position, comprising the stalls for the die ends of the carriers and the releasing and cut-off spring catches for the pivoted ends of said carriers, cooperating with an escapement action arranged and operating substantially as described.

14. The combination with the die-carrier guides and the sets of die-carriers pivoted to said guides, of the cut-off and releasing spring catches engageable with the pivoted ends of said carriers and the bank of keys each provided with depending cam-lugs having cut-off and releasing cam surfaces for operating said catches in the proper order, substantially as described.

15. The combination with the pivoted die-carriers, of the stalls for upholding the die ends of the same in their normal or idle position and a stall gate underreaching said die-heads and controlling the entrance to said stalls for the distribution of the released carriers, substantially as described.

16. The combination with the die carrier guides and the series of die carriers pivoted to said guides, of the stalls for the die ends of said carriers, the key controlled releasing spring catches for the pivoted ends of said carriers, a gate controlling the entrance to said stalls and a common plate bearing all of said releasing spring catches and movable away from the carrier guides, for permitting the return or distribution of the released die carriers, substantially as described.

17. The combination with the endless carrier, the compression-box located below said carrier, the die carrier guides and the die-carriers pivoted to said guides, of the lifting and returning bar underlying the assembled die-carriers and movable lengthwise of said guides for the return of the pivoted ends of the released carriers to their normal or distributed positions on said guides, substantially as described.

18. The combination with a pivoted table, of a series of die carrier-guides thereon which are vertical when the table is in assembling position and become horizontal in the pivotal or distributing movement of the table, a series of die carriers pivoted to said guides which swing thereon into a common line of assembly substantially parallel with their guides, and a temporary retainer carried by said table for temporarily holding the die-carriers from return pivotal movement until the proper time in the turning of said table, substantially as described.

19. The combination with the pivoted table, of the die-carrier guides thereon, the die carriers pivoted to said guides, the assembling belt on said table, the die-carrier lifting and returning bar underlying the assembled die-carriers, and the temporary retaining guide for the die ends of the carriers operative to retain the die ends of the assembled carriers in line while being lifted above the belt and to prevent any pivotal motion of the carriers on their guides during the initial part of and until the proper point in the pivotal movement of said table, substantially as described.

20. The combination with the pivoted table, of the assembling belt, the die carrier guides on said table, the die carriers pivoted to said guides, the carrier lifting and returning bar underlying the assembled carriers, the temporary retainer on said table for the die ends of the assembled carriers and means for shifting said retainer into and out of its retaining position, at the proper times to afford clearance for the pivotal movement of the carriers into the line of assembly, to prevent pivotal movement thereof during the initial part of the table's downward movement and finally to release and permit the pivotal movement of said carriers at the proper point in the table's movement, substantially as described.

21. The combination with the pivoted table, of the assembling belt, the die carrier guides thereon, the die carriers pivoted to said guide, the carrier lifting and returning bar, underlying the assembled carriers, the temporary retaining guide, on said table, for the die ends of the assembled carriers, under tension, to assume its innermost or retaining position, a cam for holding the same out of the path of said carriers, when the table is in assembling position, and a cam for withdrawing the same from under the die carriers, at the proper time, in the table's downward movement, substantially as described.

22. The combination with the pivoted table, of the die carrier guides, die carriers pivoted to said guides, and the temporary retainer for the assembled die-carriers, all on the said table, of a spring tending to throw said guide into its innermost position, and a hand controlled cam on the fixed frame to which the table is pivoted, operative on the return movement of the table to throw the said retainer into its outermost or clearing position, and adapted to be tripped, to permit the said retainer to assume its innermost or retaining position, substantially as described.

23. The combination with the pivoted table of the die carrier guides, the die carriers pivoted to said guides, and the temporary retainer under tension, to assume an innermost position, of a fixed cam operative on said retainer, under the downward movement of the table, to throw the same out from under the carriers, at the proper time, substantially as described.

24. The combination with the pivoted table, of the die carrier guides and the assembling belt on said table, the die carriers pivoted to said guide, stalls on said table, for holding the die ends of said carriers in their normal or idle position, and an abutment board or bar movable lengthwise of said belt, for co-operation with gravity, under the downward pivotal motion of said table, to align the die ends of the released carriers, with the mouths of said stalls, as required for distribution, substantially as described.

25. The combination with the pivoted table of the assembling belt thereon, the die carrier guides, the die-carriers pivoted to said guides, the lifting and returning bar underlying the assembled die-carriers, and the stall aligning or abutment board, movable lengthwise of the said belt, under the downward movement of the said table, substantially as and for the purpose set forth.

26. The combination with the pivoted table, of the die-carrier guides, and the assembling belt on said table, the die carriers pivoted to said guides, the temporary retaining guide, for the die ends of the assembled carriers, the lifting and returning bar underlying the assembled carriers, and the stall-aligning or abutment board movable lengthwise of the said belt, under the pivotal movement of the table, all the said parts cooperating substantially as and for the purposes set forth.

27. The combination with the pivoted table, of the die carrier guides and the assembling belt thereon, the die carriers pivoted to the said guides, the temporary retainer for the die ends of the assembled carriers, the stall aligning or abutment board, movable lengthwise of the belt under the pivotal movement of said table, means for throwing the temporary retainer out from under the die carriers, to render the same subject to said abutment board, and means for turning the said table downward with a pause or stationary interval, at the time when the temporary retainer is withdrawn from the carriers, whereby vibration of the carriers will be prevented, at the time when they become subject to said abutment board, substantially as described.

28. The combination with the pivoted table, of the die carrier guides and the assembling belt thereon, the die carriers pivoted to said guides, the lifting and returning bar underlying the assembled carriers, the temporary retainer for the die ends of said assembled carriers, the stall aligning or abutment board, movable lengthwise of said belt, the movable plate carrying the releasing catches for the pivoted ends of the carriers, the stall gate and cams cooperating with said lifting-bar, retaining-guide, abutment-board, catch-plate and stall-gate, under the pivotal movement of the table, for the distribution of the assembled carriers, substantially as described.

29. The combination with the pivoted table, of the constantly running shaft, provided with a cam driving disk, of a cam loose on said shaft and provided with a pawl or pawls, engageable with said disk, but normally held out of contact therewith, a sector gear pivoted cam-lever bearing against the said cam, and a sector gear on the said table, for effecting and controlling the pivoted movements of said table, with the said cam constructed to permit a stationary interval or a period of pause, in the downward movement of the table, substantially as and for the purpose set forth.

30. The compression-box for the assembled die carriers, comprising banking surfaces for the assembled line, a clamping plate for one side of the line, which normally stands out of the path of the die carriers, when moving into or out of the line of assembly, an end clamping plate for the feet of the dies and a movable clamping plate operative endwise of the line, which parts cooperate to compress the assembled dies into a justified line and hold the same rigidly together, substantially as described.

31. The combination with the fixed parts of the compression-box, of the movable side, back and end clamps, for clamping the assembled dies together into a justified line, and cams on a common shaft for moving said clamps, all of which are operative from a single source, substantially as described.

32. The combination with the fixed parts of the compression-box, of the movable side, back and end clamps, for clamping the dies into a justified line, a platen carrying the material to be impressed, movable toward and from the face ends of the dies, and cams on a common shaft for operating all of said movable parts from a common source, substantially as described.

33. The combination with the pivoted table, of the die carrier guides, the die-carriers pivoted to said guides, the stalls for the die ends of said carriers having a stall-gate which is under tension to assume its closed position, and a cam operative to throw the said gate into its open position, at the proper time, in the downward movement of said table, substantially as described.

In testimony whereof I affix my signature in presence of two witnesses.

THOMAS C. HARGRAVE.

Witnesses:
JAS. F. WILLIAMSON,
WM. FAUR KNOX.